3,213,447
RADAR SYSTEM FOR TERRAIN AVOIDANCE

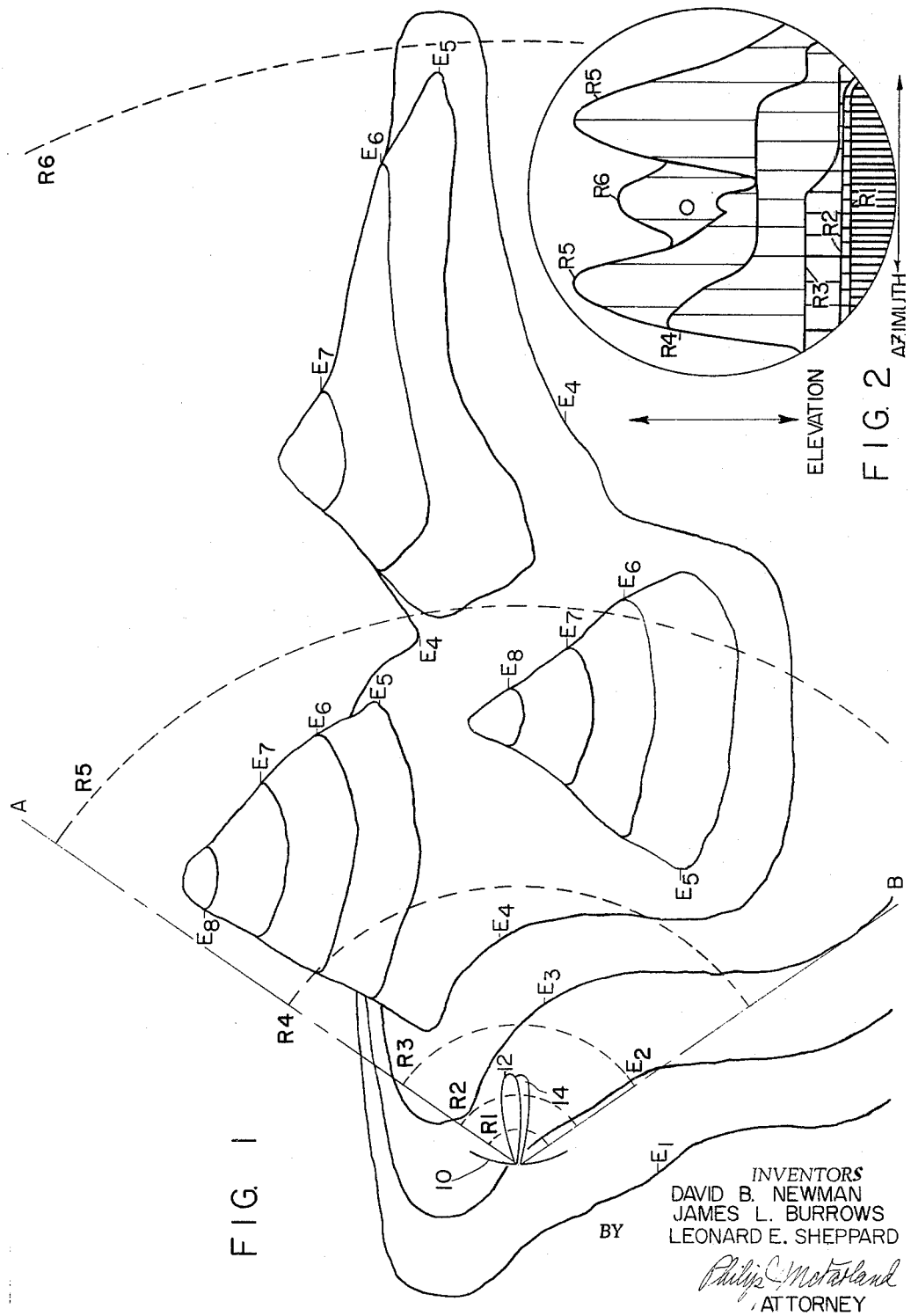

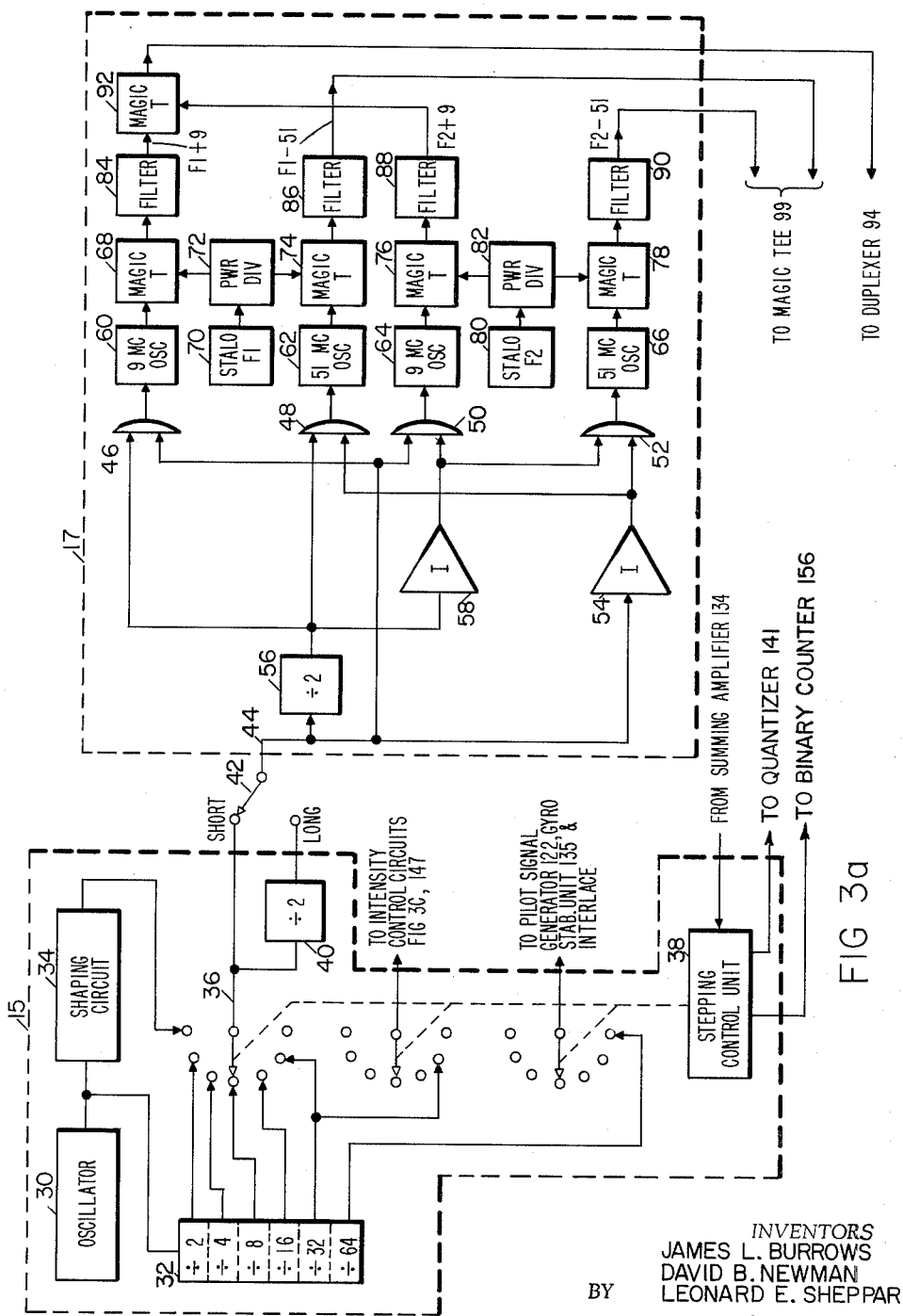

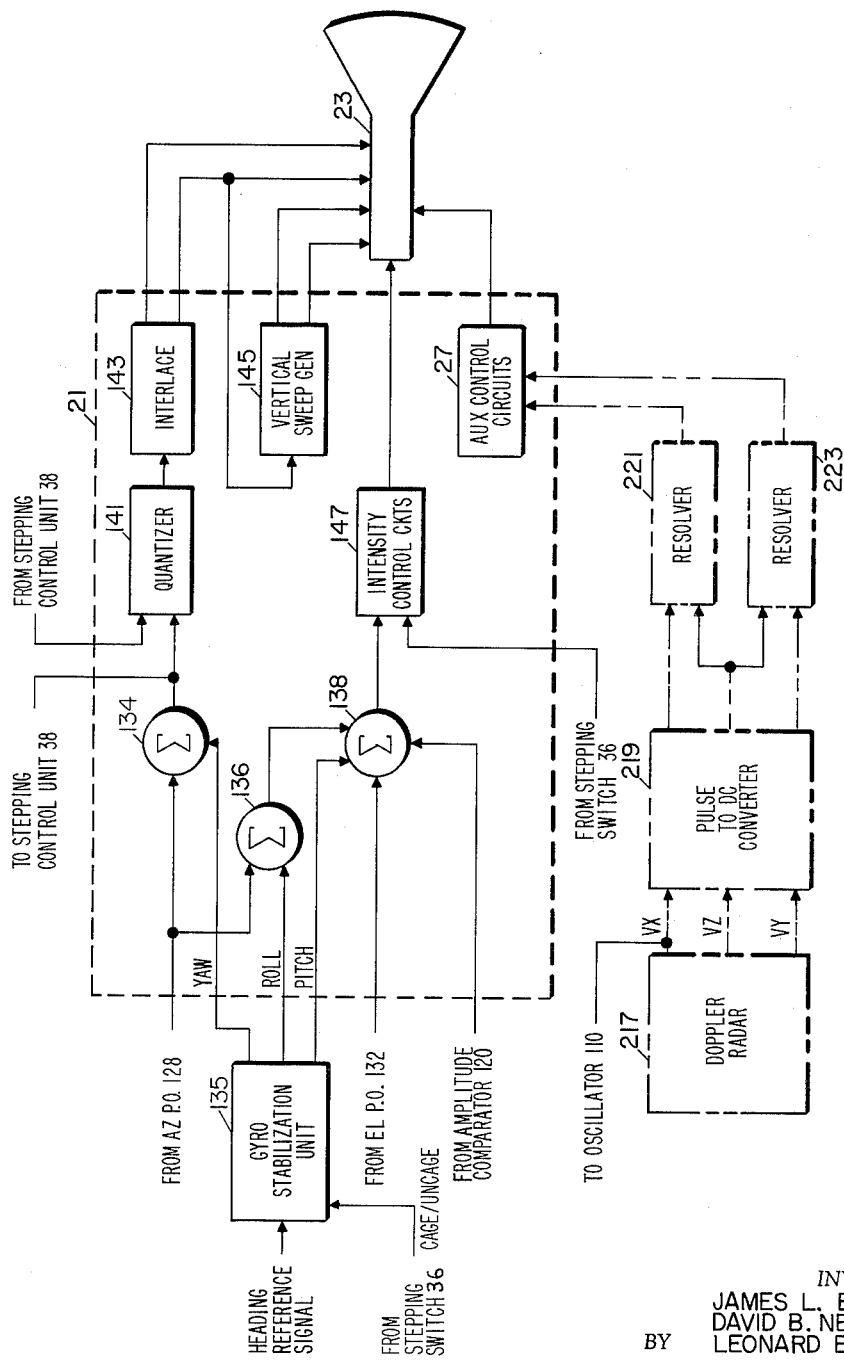

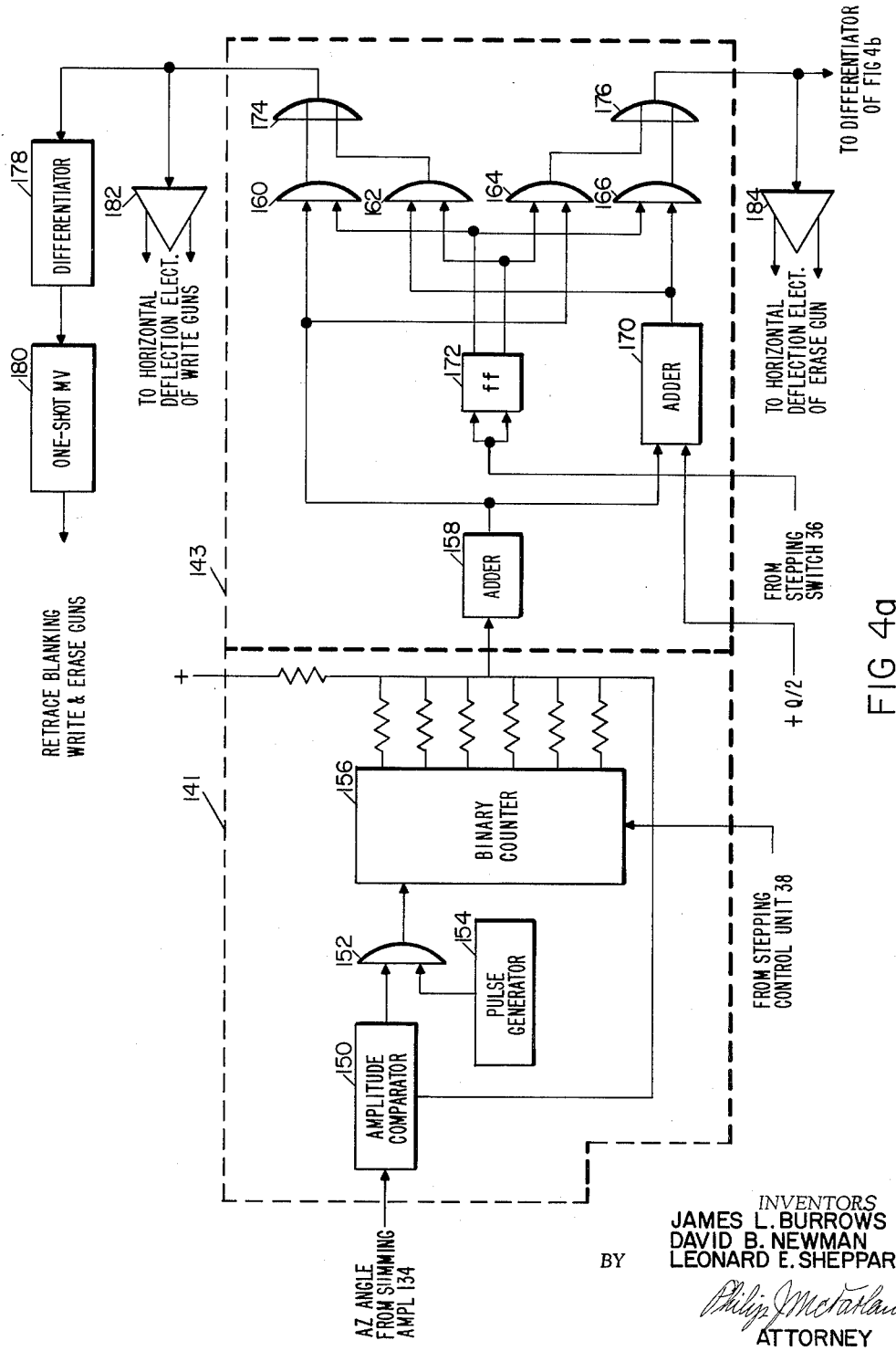

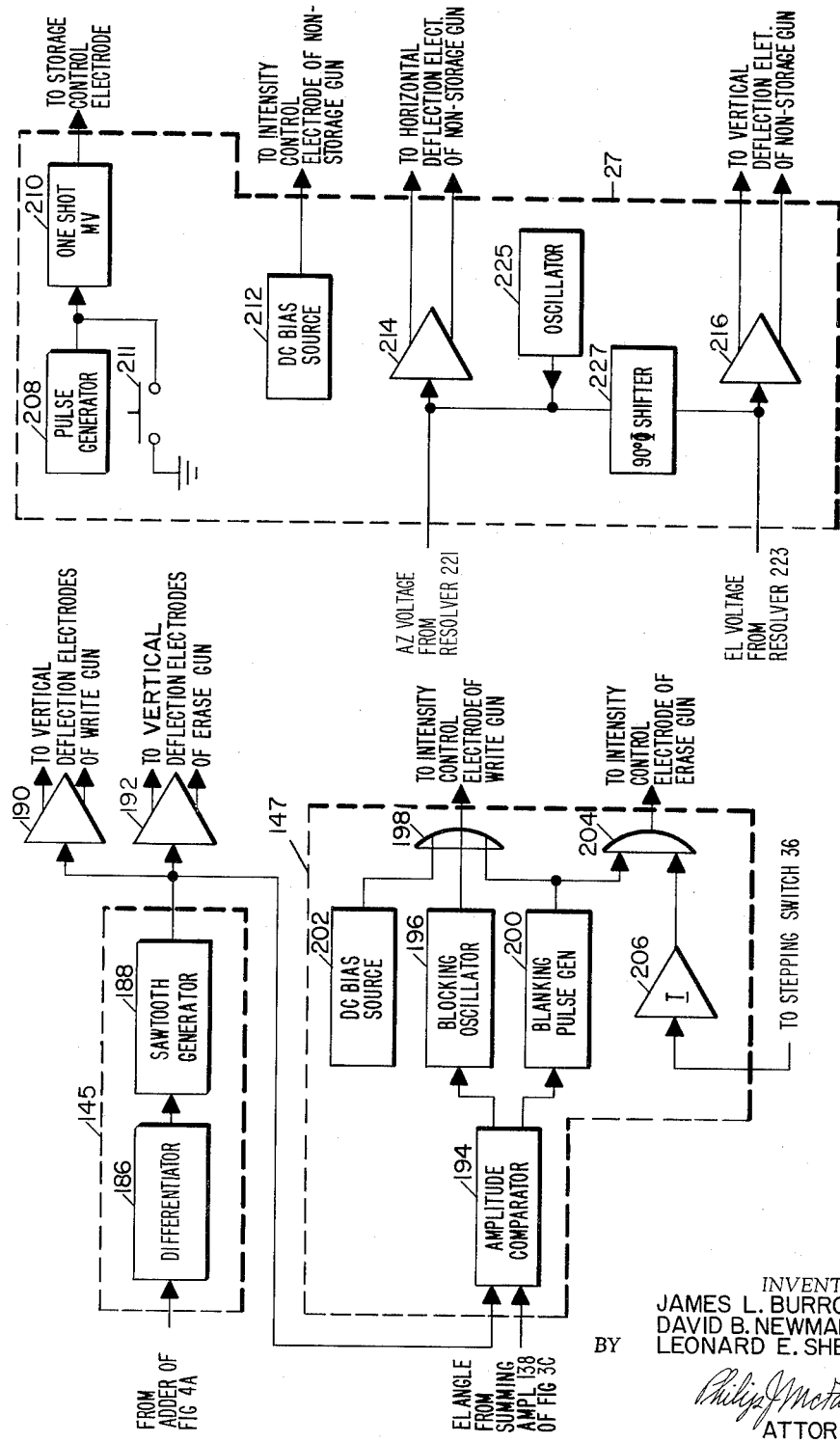

James L. Burrows, Norwell, David B. Newman, Wayland, and Leonard E. Sheppard, Natick, Mass., assignors to Laboratory for Electronics, Inc., Boston, Mass., a corporation of Delaware
Filed Apr. 22, 1963, Ser. No. 274,604
8 Claims. (Cl. 343—7)

This invention pertains generally to navigational radar systems and particularly to airborne systems which are adapted to detect terrain contours in the flight path of a vehicle carrying such a system and to provide a visual indication of the contours of such terrain.

So-called "terrain-clearance" radars have been developed in recent years to permit aircraft to fly safely at relatively low altitudes, regardless of visual conditions and the actual contours of the terrain over which the aircraft passes. All known radars specifically designed for performing such a function operate generally on the principle that if the elevation angle of the portion of the radar horizon lying in the flight path of an aircraft is tracked, then a signal may be derived which indicates how the altitude of the aircraft must be changed if a predetermined "safe" clearance over obstacles in the flight path of the aircraft is to be maintained.

To accomplish the desired result, it is conventional to provide a forward-looking radar having an antenna which is movable only in elevation. Thus, after electromagnetic energy is propagated and reflected from the terrain in the flight path of an aircraft, it is possible to control the elevation angle of the antenna in response to the received energy until a condition is reached wherein the amount of received energy is below a predetermined level. When such a condition obtains, the elevation angle of the antenna is an analogue of the elevation angle of the radar horizon with respect to a horizontal plane passing through the aircraft. It is, therefore, a simple matter to change the altitude of the aircraft until the elevation angle of the radar horizon is such as to ensure safe clearance of the aircraft over the highest obstacle in its flight path.

While known terrain-clearance radars adequately perform their main purpose, several limitations and shortcomings have restricted their use to special applications. For example, since the actual radar horizon (which may be miles away from the aircraft) must be tracked if proper performance is to be attained, relatively high-powered radar apparatus is required. Consequently, when such apparatus is operated at low altitudes or in close proximity to obstacles, "second time" echoes and/or "side-lobe" echoes cause serious errors in the indicated position of the radar horizon. Further, no information concerning the character of the terrain intermediate the aircraft and the radar horizon may be derived. As a result, then, the aircraft may not be safely flown so as to maintain a constant safe clearance over a hilly terrain, but rather must be flown at such an altitude as to safely clear the highest obstacle in its flight path. That is, since there is no way of obtaining information concerning the character of the terrain on either side of the flight path of the aircraft, presently known terrain-clearance radars may not, except at great risk, be depended upon to furnish the navigational information required to maneuver around obstacles, as hills.

Therefore, it is a primary object of this invention to provide an improved airborne radar system which will provide a visual representation of the elevation contours of terrain lying within a sector including the line of flight of an aircraft.

Another object of this invention is to provide an improved terrain-clearance radar system for aircraft, which system provides information concerning the contours of terrain intermediate the aircraft and the radar horizon.

Still another object of this invention is to provide an improved terrain-clearance radar system for aircraft, which system is adapted to furnishing information permitting the safe navigation of aircraft around obstacles.

Still further, another object of this invention is to provide an improved terrain clearance radar system meeting the foregoing objects and utilizing relatively low-powered and conventional components.

These and other objects of the invention are attained generally by providing, in an aircraft: a forward-looking radar having an antenna which is adapted to be scanned in azimuth through a predetermined sector and to be moved in elevation to track the highest point of the terrain within such sector and a first predetermined range from the radar; forming on the viewing screen of a cathode ray tube, a visual indication of the elevation angle of the antenna as a function of azimuth angle throughout the predetermined sector; and, repeating the foregoing a number of times, each time increasing the predetermined range, to derive a plurality of visual indications of terrain contours at different ranges until all the topographical features of the terrain within the predetermined sector are displayed. As the individual visual indications are formed, the brightness of the display is controlled so that there is a noticeable gradation of brightness between each successive one so that, when the whole display is integrated by the eye of an observer an illusion of the range to each contour line is created. In addition, a cursor mark indicating the flight path of the aircraft is formed on the viewing screen of the cathode ray tube. Thus, by maneuvering the aircraft until the cursor line clears close obstacles, the aircraft may be navigated safely over any kind of terrain.

For a more complete understanding of this invention, reference is now made to the following description of a preferred embodiment thereof and to the accompanying drawings, in which:

FIG. 1 is a perspective view of an assumed terrain, illustrating the general principles of this invention;

FIG. 2 is a sketch of the viewing screen of a cathode ray tube in apparatus according to this invention, illustrating the appearance of the terrain of FIG. 1 on such a viewing screen;

Figure 3B:
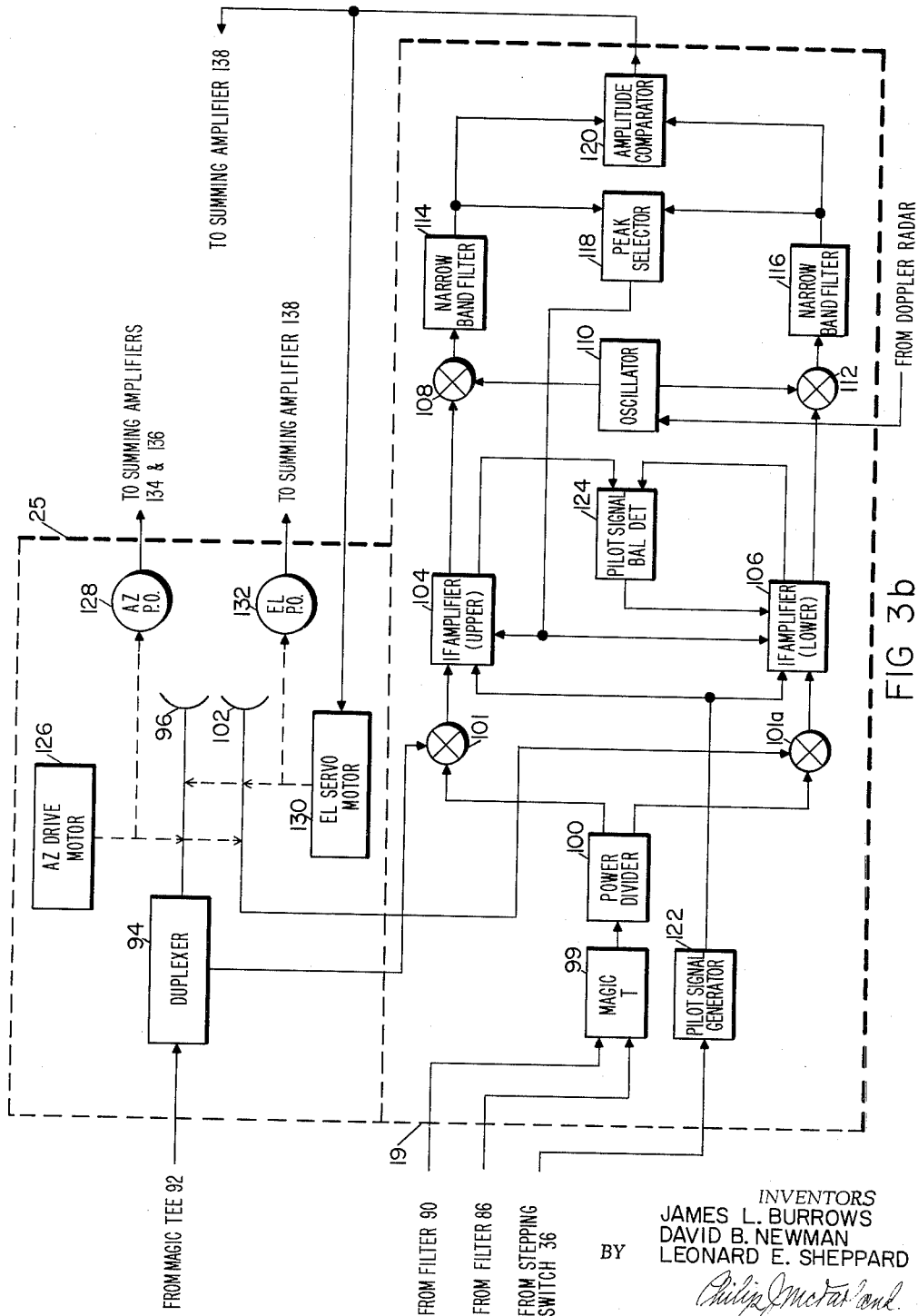

FIGS. 3a, 3b, 3c together are a block diagram of a preferred embodiment of a terrain-clearance radar according to this invention; and FIGS. 4a and 4b taken together, constitute a more detailed block diagram of portions of the block diagram of FIG. 4, showing in more detail a preferred arrangement of elements for energizing a cathode ray tube to obtain the visual presentation illustrated in FIG. 2.

Referring now to FIG. 1, it may be seen that the prominent topographical features of the assumed terrain are three peaks and that an aircraft (not shown) supports an antenna 10 at a relatively low altitude, here less than the elevation of the peaks. The constant elevation contours of the illustrated terrain are designated as $E_1$ through $E_8$. The antenna 10, for reasons that will become clear hereinafter is so fabricated as to produce an upper beam 12 and a lower beam 14. Further, as will be explained in detail hereinafter, the beams 12, 14 are scanned through a sector indicated by the broken lines A, B extending radially from the antenna 10. The repetition rate at which the radar emits bursts of electromagnetic energy is changed in a predetermined manner so that, for a fixed duty cycle, the maximum range from which usable power is reflected from the terrain is cyclically changed from scan to azimuth scan. In the preferred embodiment, again as will be explained in detail hereinafter, the repetition rate of the radar is decreased by successive powers of two. The arcs $R_1$ through $R_6$ indicate such maximum ranges. Further, it is apparent that there should be provision made to avoid unwanted returns (as "second-time" echoes or "side-lobe" echoes) from degrading the performance of the radar as the range to the scanned portion of the sector is changed. As will be explained hereinatfer, frequency shift keying from pulse to pulse will effectively reject such unwanted returns.

If pulses of electromagnetic energy of a given frequency and length be repetitively transmitted on the upper beam 12 and received on both the upper beam 12 and the lower beam 14, it is obvious that the strength of the signal received by the upper beam 12 (assuming that the two beams 12, 14 have similar shapes and overlap each other) will normally be larger than the signal received by the lower beam 14 when the upper beam 12 is directed at the terrain. If, however, the length of the transmitted pulse is such that eclipsing (meaning reception of reflected energy during a period of transmission) begins on the upper beam but not on the lower beam, or if the upper beam is pointed above the radar horizon, then the "eclipsed" portion of the reflected energy in the upper beam 12 is lost. It follows, then, that the "effective" reflected signal in the upper beam 12 is reduced, approaching the strength of the signal in the lower beam 14. The same condition obtains when any portion of the upper beam 12 is pointed above the radar horizon. Thus, as the upper beam 12 and the lower beam 14 are scanned together through the azimuth sector A–B the strength of the signal received on the upper beam 12 may be compared with the strength of the signal received on the lower beam 14 to produce an error signal indicative of such signal strengths relative to each other. The error signal may then be applied to the antenna drive means (see FIG. 3b) to move the beams 12, 14 in elevation until the error signal disappears. When such a condition obtains, the beams bear either a fixed predetermined relationship to the radar horizon or to a particular one of the lines $R_1$ through $R_6$. It follows that, if the elevation angle of the beams 12, 14 be plotted as a function of azimuth angle, then such a plot is an analogue of terrain contours as a function of azimuth angle.

It has been found to be advantageous to utilize a so-called storage tube known as a "Tonotron" manufactured by the Hughes Aircraft Corp. of Los Angeles, California, for displaying the desired plot of elevation angle of the beams 12, 14 as a function of azimuth angle thereof. Briefly such a cathode ray tube incorporates a first electron gun, hereinafter referred to as the writing gun, energized so as to form a persistent trace, a second electron gun, hereinafter referred to as the erase gun, energized so as to remove any portion of the persistent trace and a non-storage gun, energized to form a short persistent trace. The circuitry required to energize the various guns in synchronism with the movement of the beams 12, 14 and substantially independently of aircraft movement is deemed to be an inseparable part of the preferred embodiment of this invention and is disclosed in detail hereinafter.

The sketch shown in FIG. 2 indicates the appearance of the viewing screen of a cathode ray tube according to this invention, except that each sweep is labelled to correspond with one of the arcs $R_1$ through $R_6$ to facilitate understanding of the figure. (In practice, only a gradation in the brightness of the bands between successive curves, here shown by hatch lines, would be depended upon for such correlation.) A cursor "I" is displayed on the viewing screen. The cursor spot "I" shows the direction in which the aircraft is moving (or, alternatively the projection of the longitudinal axis of the aircraft). Thus, by maneuvering the aircraft so that the cursor spot "I" lies above all contour lines within a given range, for example the line labelled $R_4$ in FIG. 2, safe clearance around obstacles between the aircraft and such range may be effected.

Referring now to FIG. 3, the main sub-assemblies of a preferred embodiment of the invention may be seen to consist of a master control unit 15 that provides synchronizing and control signals to a keyed radar transmitter 17, a dual channel radar receiver 19, control circuits 21 for a cathode ray tube 23, an antenna assembly 25 and auxiliary control circuits 27 for the cathode ray tube 25.

The master control unit 15 includes a conventional oscillator 30 having a fixed frequency output. The period of such output signal preferably is equal to twice the period of time required for electromagnetic energy to be propagated and returned from a target at a selected maximum range. In the illustrated example, the selected maximum range is 100 yards and the frequency of the oscillator 30 is fixed at 1.64 megacycles to produce the signal marked "100 yds." This signal in turn is fed into a counter 32 and through a shaping circuit 34 (which circuit may be simply an overdriven amplifier) into a conventional stepping switch 36 having three sections. The counter 32 is a conventional binary counter having, say, 8 stages. Thus, the period of the signal output of each successive stage of the counter 32 is longer than the period of the "100 yds." signal by successive powers of 2. The movable contact of each section of the stepping switch is automatically moved by a stepping switch control device 38. This latter element may consist of a conventional solenoid, actuated in response to a signal indicating the end of an azimuth sweep (which signal is derived in a manner to be described in more detail hereinafter). A conventional single stage binary counter 40, together with appropriate signal shaping and buffer circuits (not shown), is connected between the "long" position of a range switch 42 and the movable contact of one section of the stepping switch. Consequently, the period and length of the substantially square wave signal on line 44 out of the range switch 42 is a function of the position of the movable contact of the first section of the stepping switch 36 and the position of the range switch 42. The signal on line 44 is then processed to control the frequency and modulation of the radar transmitter 17 and to provide appropriate local oscillator signals for demodulating the signals reflected from terrain.

The keyed radar transmitter 17 essentially consists of means for repetitively transmitting pulses of electromagnetic energy, the carrier frequency of alternate pulses being frequency shifted, and for generating appropriate local oscillator signals. Thus, the square wave signal on line 44 is processed so as to selectively enable AND gates 46, 48, 50, 52. That is, the signal on line 44 is led directly to AND gates 46, 50 and, through an inverter 54, to AND gates 48, 52. The square wave signal on line 44 is also led through a binary counter 56 to AND gates 46 and 48, and through both the binary counter 56 and an inverter 58 to AND gates 50, 52. A moment's thought will make it clear that the AND gates 46, 48, 50, 52 are enabled, successively, for a period of time equal to one half the period of the square wave signal on line 44. Consequently, oscillators 60, 62, 64, 66 are gated on successively to produce the indicated side step frequencies. The output of oscillator 60 is fed into a magic tee 68 along with a portion of the output of a continuously operated microwave oscillator, or Stalo, 70, which portion is derived through a power divider 72. The remaining portion of the output of the microwave oscillator 70 is fed to a magic tee 74 which also receives the output of the oscillator 62. In like manner, a magic tee 76 and a magic tee 78 are energized, respectively, by the output of the oscillator 64, the output of the oscillator 66 and the output of a second microwave oscillator 80 through a power divider 82. It will be obvious that if the frequencies of the microwave oscillators 70, 80 differ by a fixed amount, then the frequency difference between individual lines in the spectrums of frequencies sequentially existing on the output lines of the magic tees 68, 74, 76, 78 will similarly differ and that appropriate filters 84, 86, 88, 90 may be provided to select different ones of the signals in each spectrum, as indicated. The output of the filter 84 and the output of the filter 88 are fed into a magic tee 92 and then through a duplexer 94 to energize an antenna 96. It may be seen from the foregoing that the frequency of the transmitted pulse from the antenna 96 is stepped, from pulse to succeeding pulse, from a first frequency to a second frequency.

The output of the filters 86, 90 are fed to a magic tee 99 and a power divider 100 and thence to microwave mixers 101, 101a to provide a local oscillator signal. It will be recognized, therefore, that the "local oscillator" frequency to the microwave mixers 101, 101a is sidestepped in synchronism with the sidestepping of the frequency of the transmitted pulses. The signal received on the antenna 96 is fed through the duplexer 94 to the microwave mixer 101 while the signal received on an antenna 102 is fed directly to the microwave mixer 101a. Thus, the output signals of the microwave mixers 101, 101a, are centered on a predetermined intermediate frequency, here 60 mc.

The dual-channel radar receiver 19, of course, includes the mixers 101, 101a. The output of the microwave mixer 101 is fed to an I.F. amplifier 104 while the output of the mixer 101a is fed to a second I.F. amplifier 106. The output of I.F. amplifier 104 is mixed in a mixer 108 with a portion of the output signal of an oscillator 110 and the output of the I.F. amplifier 106 is mixed in a mixer 112 with the remaining portion output of oscillator 110. It should be noted here that although oscillator 110 may be of a fixed frequency output, as 60 mc., to remove the IF carrier frequency, it may be desirable to vary the frequency of the output of the oscillator 110 in accordance with the Doppler shift impressed on the received signals due to motion of the aircraft. Such a variation is conveniently obtained, if the aircraft is also equipped with a so-called Doppler radar for navigation, by shifting the frequency of the output of the oscillator 110 by means of a correction signal indicative of the Doppler shift as determined by such Doppler radar, as shown in FIG. 3b. The output of the mixer 108 is led through a narrow band filter 114 and the output of the mixer 112 is led through a narrow band filter 116 to remove all vestiges of the IF carrier frequency and produce D.C. signals whose amplitudes are proportional, respectively, to the amplitude of the signals out of I.F. amplifiers 104, 106 and low frequency signals below the cutoff frequency of the narrow band filters 114, 116. A portion of the signals out of the narrow band filters, 114, 116 is fed to a peak selector 118 (which may comprise a conventional assembly of a separate peak detector for each input signal connected to an amplitude comparator, the output of the latter being fed through diodes to an OR gate, to produce an output signal which is proportional to the higher of the two input signals), to provide an automatic gain control for the I.F. amplifiers 104, 106. The remaining portion of the output signals of the narrow band filters 114, 116 is impressed on an amplitude comparator 120. The output signal of such a comparator, then, is an error signal whose amplitude and polarity is indicative of the difference in amplitude between the signals out of the I.F. amplifiers 104, 106.

The sensitivity of each I.F. amplifier 104, 106 is also periodically balanced by inserting the signal output of a pilot signal generator 122 into the two amplifiers and adjusting one until there is no difference in their outputs. Thus, the stepping switch 36 is so connected, in the illustrated case, that gating signals are removed from the keyed radar transmitter 17 and a gating signal is applied to the pilot signal generator 122 when the seventh step is reached. The outputs of the I.F. amplifiers 104, 106 are compared in a conventional balanced detector 124 to produce an automatic gain control signal which is applied to one of the I.F. amplifiers here, amplifier 106. Consequently, the sensitivities of the I.F. amplifiers 104, 106 are balanced periodically and automatically during operation of the apparatus. In a practical case, if the stepping switch 36 is moved through its 7 steps in ten seconds, the I.F. amplifiers 104, 106 are balanced approximately every eight seconds.

The antenna assembly 25 comprises in addition to the antennas 96, 102 (which may be of any desired known configuration), a conventional azimuth drive motor 126 mechanically disposed, as shown by the dotted lines in FIG. 3, to cause the antennas 96, 102 to scan, in azimuth, a predetermined sector on either side of the flight path of the aircraft. As the azimuth drive motor 126 drives the antennas 96, 102 through such a sector scan an azimuth pick-off device 128 is also actuated to produce a signal indicative of the instantaneous azimuth position of the antennas 96, 102. The azimuth pick-off device 128 preferably is a conventional potentiometer having its fixed terminals connected across a D.C. voltage source (not shown) and its movable arm driven in synchronism with the movement of the antennas 96, 102 in azimuth. Thus, the output of the azimuth pick-off device 128 is a D.C. voltage the amplitude of which is an analogue of the instantaneous azimuth position of the antennas 96, 102 with respect to the center line of the aircraft on which the antennas 96, 102 are mounted. The antennas 96, 102 are moved in elevation by a servo motor 130 in substantially the same manner as they are moved in azimuth by the antenna drive motor 126. The servo motor 130, however, is responsive to the error signal out of the amplitude comparator 120 to move the antennas 96, 102 in elevation until the error signal out of the amplitude comparator 120 disappears. An elevation pick-off device 132 which is similar structurally to the azimuth pick-off device 128 is driven by the servo motor 130 so as to produce a D.C. voltage on its output which is a function of the elevation angle between the antennas 96, 102, and the longitudinal axis of the aircraft on which the antennas 96, 102 are mounted.

From the foregoing it may be seen that the outputs of the azimuth pick-off device 128 and the elevation pick-off device 132 are voltages representative, respectively, of the azimuth and elevation positions of the antennas 96, 102 in an ideal case, i.e. when the aircraft is not to yawing, rolling or pitching and balance in the returns to the two antennas indicates that the elevation angle of the two is such that the antennas are tracking either an actual radar horizon or an "assumed" horizon at a known range. It remains therefore to provide correction factors to compensate for any yawing, pitching or rolling and to convert such corrected information into a visual representation. The output of the azimuth pick-off device 128 is fed into a summing amplifier 134 into which is also fed a voltage proportional to the yaw angle of the aircraft as determined by a conventional gyro stabilization unit 135 which is periodically aligned when the sensitivities of the I.F. amplifiers 104, 106, are being adjusted. Thus, the output of the summing amplifier 134 is a voltage which is proportional to the azimuth angle between the antennas 96, 102 and the actual line of flight of the aircraft. The output of the azimuth pick-off device 128 is also fed into a summing amplifier 136 into which is also fed a voltage proportional to the roll angle of the aircraft (again as determined by the gyro stabilization unit 135). The output of the summing amplifier 136 is fed into a summing amplifier 138, which element is also fed by a voltage from the gyro stabilization unit 135 which is proportional to the pitch angle of the aircraft. The output of the elevation pick-off device 132 and the output of the amplitude comparator 120 are also fed into the summing amplifier 138. Thus, the output of the summing amplifier 138 is a voltage which is indicative of the instantaneous vertical angle between a horizontal plane through the longitudinal axis of the aircraft and the direction in which the antennas 96, 102 should be pointing. It should be noted that coupling the error voltage directly from the amplitude comparator 120 to the summing amplifier 138 simply compensates for the inertia of the elevation driving system for the antennas 96, 102 which may on occasion, as when the radar is used in precipitous terrain, be important.

A portion of the output signal of the summing amplifier 134 is returned to the stepping switch control device 38. It may be seen, therefore, that when the azimuth drive motor 126 moves the antennas 96, 102 to an extreme limit of the azimuth sector being scanned and starts to return the antennas 96, 102 to their starting position for the next azimuth scan, a sensible change in such portion of the output signal of the summing amplifier 134 will occur. Alternatively, of course, a microswitch (not shown) could be disposed so as to be actuated when the azimuth drive motor 126 moves the antennas 96, 102 to the extreme limit of the azimuth sector to produce a signal indicating the end of each azimuth scan. In any event, however, the stepping switch control device 38 (which may comprise a conventional actuating solenoid energized in response to the sensible change in the output of the summing amplifier 134 or actuation of the microswitch) causes the movable contact of the stepping switch 36 to step to its next higher position and produces a clearing signal. The purpose of the clearing signal will become evident hereinafter. Thus, each time the azimuth drive motor 126 drives the antennas 96, 102 to the extreme limit of the azimuth sector, the stepping switch 36 is moved so as to change the width of the gating signal out of the master control unit 15 to the keyed radar transmitter 17 and to provide the desired gating signals to the intensity control circuits of the control circuits 21, the pilot signal generator 122 and the gyro stabilization unit 135 as previously described.

The output of the summing amplifier 134 is also fed into a quantizer 141 (to be described in more detail hereinafter) wherein the varying D.C. voltage at the output of the summing amplifier 134 is converted into a step function. Such a step function then is fed into an interlace circuit 143 (again to be described in more detail hereinafter) and from that circuit to appropriate horizontal deflection electrodes of the cathode ray tube 23. At the same time, the step voltage out of the interlace circuit 143 energizes a vertical sweep generator 145 and the intensity control circuits 147 of the cathode ray tube 23.

Referring now to FIGS. 4a and 4b, it may be seen that quantizer 141 comprises an amplitude comparator 150 which compares the varying D.C. voltage from the summing amplifier 134 of FIG. 3c with a portion of the step function output of the quantizer 141 to produce an enabling gate whenever the amplitude of the signal out of the summing amplifier 134 exceeds the output of quantizer 141 by a predetermined amount, here designated as $Q/2$ volts, where Q equals the magnitude of each step in the step function. The enabling signal out of the amplitude comparator 150 is fed to an AND gate 152, which gate then is conditioned to pass a signal out of a pulse gentrator 154. That is, whenever the enabling signal from the amplitude comparator 150 enables AND gate 152, a pulse is passed through the latter element from the pulse generator 154 to a binary counter 156. The various stages of the binary counter 156 are each connected to an adder circuit (not numbered), as shown, so that the final output of the quantizer 141 is the sum of the output of all the stages of the binary counter 156 and the voltage derived from a source (not numbered) of D.C. voltage. It may be seen, therefore, that by proper selection of the pertinent circuit elements, the AND gate 152 may be enabled in such a manner as to permit a single pulse from the pulse generator 154 to cause the binary counter 156 to advance one count only to produce the desired step function. A clear signal for the binary counter 156 is derived from the stepping switch control device 38 of FIG. 3a when the antennas 96, 102 reach the end of the azimuth sector. Consequently, after each azimuth scan all the stages of the binary counter 156 are cleared and the output of the quantizer 141 returns to a predetermined level preparatory to again generating the step function. The interlace circuit 143 comprises a conventional adder circuit 158 fed by the output of the quantizer 141 and a negative D.C. voltage which is equal to one half the amplitude of each successive step out of the quantizer 141. This biasing voltage is $Q/2$ volts, where "Q" equals the amplitude of a step out of the quantizer 141, in order to correlate the step function out of the quantizer 141 with the actual position of the antennas 96, 102. The output of the adder 158 is led directly to a switching matrix made up of AND gates 160, 162, 164, 166, and through an adder 170 to the same switching matrix. The adder 170 is energized by a D.C. voltage equal to $+Q/2$. As a result of this last operation, the waveform of the step voltage out of the adder 170 is interlaced with the step voltage out of the adder 158. The individual AND gates 160, 162, 164, 166, are enabled by the direct and complementary outputs of a flip flop 172, as shown. That is, AND gates 160 and 166 are enabled, while simultaneously AND gates 162 and 164 are disabled. When the output of the flip flop 172 switches AND gates 160 and 166 are disabled and AND gates 162 and 164 are enabled. It may be seen, therefore, that the switching matrix is in effect a double pole-double throw switch whereby the step voltages out of the adder 158 and the adder 170 are interchanged on the output lines of the interlace circuit 143 after passing, respectively, through OR gates 174, 176. The flip flop 172 is set and reset whenever the stepping switch 36 of FIG. 3a reaches its seventh position. In other words the outputs of the adder 158 and the adder 170 are switched at the end of each complete cycle of the stepping switch 36. The output of the OR gate 174 is split, one portion thereof passing through a differentiator 178 and a one-shot multivibrator 180 responsive to the negative going signals out of the differentiator 178 to provide retrace blanking to the intensity control electrodes of the cathode ray tube 23. The remaining portion of the output of the OR gate 174 passes through a push-pull amplifier 182 to the horizontal deflection electrodes of the write gun of the cathode ray tube 23. The output of the OR gate 176 is also split, a portion of it passing through a push-pull amplifier 184 to the horizontal electrodes of the erase gun in the cathode ray tube 23. It may be seen, therefore, that from frame to frame the deflection electrodes of the write gun and the erase gun are interchanged. Since the two step voltages causing horizontal deflection are interlaced the electron beam from the write gun and the electron beam from the erase gun are interlaced on the viewing screen of the cathode ray tube 23. Therefore, images formed on the viewing screen of the cathode ray tube 23 may, if desired, be selectively erased from frame to frame. A portion of the output of the OR gate 176 is led through a differentiator 186 to a sawtooth generator 188. The latter element is responsive to positive going pulses out of the differentiator 186. Consequently, the sawtooth generator 188 produces a sweep voltage synchronized with each step in the particular waveform out of the OR gate 176. The sweep voltage out of the sawtooth generator 188 is passed through a push-pull amplifier 190 to the vertical deflection electrode of the write gun of the cathode ray tube 23 and through a push-pull amplifier 192 to the vertical deflection electrode of the erase gun of the cathode ray tube 23. Thus, for each step of the step waveform impressed on the horizontal deflection electrodes of the write and erase guns of the cathode ray tube 23, a vertical deflection voltage sufficient to deflect the electrode beams from the guns the full extent of the viewing screen of the cathode ray tube 23 may be produced. A portion of the output of the sawtooth generator 188 is also fed to an amplitude comparator 194. The second input to the amplitude comparator 194 is the output voltage of the summing amplifier 138 of FIG. 3. Consequently, when the sweep voltage out of the sawtooth generator 188 is less than the output voltage of the summing amplifier 138, the amplitude comparator 194 may be so connected that it produces no signal output. When, however, the amplitude of the sweep voltage out of the sawtooth generator 188 equals the amplitude out of the output voltage of the summing amplifier 138 a gating signal is produced by the amplitude comparator 194 to trigger a blocking oscillator 196. The output of the blocking oscillator 196 is connected to an OR gate 198. When the amplitude of the sweep voltage out of the sawtooth generator 188 is greater than the amplitude of the output voltage of the summing amplifier 138, the ampitude comparator 194 produces a signal which actuates a blanking pulse generator 200. The output of the blanking pulse generator 200 is also led to the OR gate 198. A third input to the OR gate 198 is a D.C. voltage from a D.C. bias source 202. The signal out of the OR gate 198 is led to the intensity control electrode of the write gun of the cathode ray tube 23. As a result, then, when the amplitude of the sweep voltage out of the sawtooth generator 188 is less than the amplitude of the signal out of the summing amplifier 138 the D.C. bias source 202 may be set at such a value as to cause the write gun to form a relatively low intensity signal on the viewing screen of the cathode ray tube 23. When the blocking oscillator 196 is triggered, the intensity control electrode of the write gun of the cathode ray tube 23 is biased, for the period of output signal from the block oscillator 196, at a very high positive level. Consequently, when the amplitude of the sweep out of the sawtooth generator 188 and the signal out of the summing amplifier 138 are equal, a very intense mark is formed on the face of the cathode ray tube 23. When the amplitude of the sweep out of the sawtooth generator 188 is greater than the signal out of the summing amplifier 138, the blanking pulse generator 200 (which may be simply an overdriven amplifier or a conventional Schmitt trigger circuit) impresses a high negative bias on the intensity control electrode of the write gun and the electron beam out of that element is cut off. The output of the blanking pulse generator 200 is also led to an AND gate 204 which is enabled by the complement of a signal from the second last position of the stepping switch 36 of FIG. 3a by way of an inverter 206. The output of the AND gate 204 is led to the intensity control electrode of the erase gun of the cathode ray tube 23. Consequently, in normal operation, the beam of the erase gun of the cathode ray tube is cut off whenever the amplitude of the sweep out of the sawtooth generator 188 exceeds the amplitude of the signal out of the summing amplifier 138. However, when writing of a frame is almost complete (as indicated by a signal from the second last position of the stepping switch 36) there is no blanking pulse applied to the intensity control electrode of the erase gun. As a result then the erase gun is not cut off during the last writing scan, thereby ensuring complete erasure of all previously written information.

The auxiliary control circuits for the cathode ray tube 23 include a circuit for controlling the length of time that any image formed on the viewing screen of the cathode ray tube 23 may, if not erased by the erase gun, remain. This circuit includes a pulse generator 208 triggering a one shot multivibrator 210, to control the voltage on the storage backing electrode of the cathode ray tube 23. In parallel with the pulse generator 208 is manually operable switch 211. When the one shot multivibrator 210 is energized by the pulse generator 208, the brightness of any image on the viewing screen of the cathode ray tube 23 gradually diminishes, whereas when the switch 211 is closed the brightness of the images on the viewing screen of the cathode ray tube decreases very rapidly.

The auxiliary control circuits also include a conventional D.C. bias source 212 connected to the intensity control electrode of the non-storages gun of the cathode ray tube 23 and means for generating a Lissajous figure on the viewing screen of the cathode ray tube 23 by means of deflection voltages applied to the horizontal and vertical deflection amplifiers 214, 216 of the non-storage gun. While the means for generating a Lissajous figure is not a portion of this invention, it is illustrated here for convenience of explanation. Thus, the pulse trains out of a Doppler radar 217 (which pulse trains are indicative respectively of velocity of the aircraft in the $x$, $y$, $z$ directions) are fed into conventional pulse to D.C. converters 219, as for example that disclosed in the application of Edward D. Osteroff et al., Serial No. 770,832 filed October 30, 1958 (now U.S. Patent No. 3,094,629), and assigned to the same assignee of the present invention. The D.C. voltages corresponding to $v_x$, $v_y$ and $v_z$ are fed through conventional resolvers 221, 223 to produce signals representative, respectively, of heading the aircraft on which the present radar system is mounted. A low frequency oscillator 225, which for example may be a one kilocycle oscillator, is connected directly to the line corresponding to the azimuth heading of the aircraft and through a 90 degree phase shifter 227 to the line representing elevation heading. If the phase shifter 227 has no appreciable insertion loss, then the amplitudes of the quadrature voltages from the one kilocycle oscillator are equal and the Lissajous figure formed on the viewing screen of the cathode ray tube is a circle. The center of the circle is displaced from the center of the viewing screen of the cathode ray tube 23 by an amount determined by the voltages on the azimuth and elevation lines out of the resolvers 221, 223.

A moment's thought will make it clear to a man having skill in the art to which this invention pertains that the preferred embodiment of the invention just described may be changed in many respects without departing from the spirit of the invention. For example, the master control unit 15 may be changed by substituting properly energized electronic gating circuits for the stepping switch 36; the keyed radar transmitter may be modified by replacing the illustrated side step transmitter (which utilizes a microwave oscillator of the klystron type) by a solid-state side step transmitter and the control circuits for the cathode ray tube 23 may be modified so that selective writing and erasing may be accomplished by varying the energizing voltages to the high voltage control electrodes of the write and erase guns rather than by interlacing the sweeps applied to the deflection electrodes thereof. From the foregoing, therefore, it may be seen that the invention should not be restricted to the embodiment thereof just shown and described, but rather should be limited only by the spirit and scope of the appended claims.

What is claimed is:
1. An airborne radar system comprising:
 (a) an upper and a lower beam-forming antenna, the axes of the beams formed by such antennas defining, in a vertical plane, an acute angle such that the two beams intersect each other;
 (b) means for scanning such antennas in azimuth;
 (c) means for transmitting, on a fixed duty cycle, pulses of electromagnetic energy from the upper beam-forming antenna;
 (d) means for separately processing reflected energy received by the upper and the lower beam-forming antennas to produce signals indicative, respectively, of the amplitude of the reflected energy received by the upper and the lower beam-forming antennas and to compare the amplitudes of such signals;
 (e) means for simultaneously varying the elevation angle of the upper and the lower beam-forming antennas until the amplitudes of the signals received thereby are equal; and,
(f) means for indicating as a function of the azimuth position of such antennas, the elevation angle at which the amplitudes of the signals received by such antennas are equal.

2. An airborne radar system as in claim 1 wherein the means for transmitting pulses of electromagnetic pulses includes:
(a) means for varying, from azimuth scan to azimuth scan, the length of the transmitted pulses of electromagnetic energy; and,
(b) means for varying, from transmitted pulse to transmitted pulse, the frequency of the electromagnetic energy in each transmitted pulse in such a manner that the frequency of the electromagnetic energy in alternate transmitted pulses is the same.

3. An airborne radar system as in claim 2 wherein the means for separately processing reflected energy received by the upper and the lower beam-forming antennas, includes:
(a) means, including a first I.F. amplifier for converting the reflected energy received by the upper beam-forming antenna to a first D.C. signal;
(b) means, including a seond I.F. amplifier, for converting the reflected energy received by the lower beam-forming antenna to a second D.C. signal;
(c) amplitude comparator means for comparing the first and the second D.C. signal to produce an error signal, the amplitude and sense of such error signal being indicative of the difference between the amplitude of the reflected energy received by the upper and lower beam-forming antennas;
(d) means for adjusting, from pulse to pulse, the sensitivity of both the first and the second I.F. amplifier in accordance with a signal indicative of the larger of the pulses of reflected energy received by the upper and the lower beam-forming antennas; and,
(e) means for equalizing, from azimuth scan to azimuth scan, the sensitivity of the first and the second I.F. amplifier.

4. An airborne radar system as in claim 3 wherein the means for varying the elevation angle of the upper and the lower beam-forming antennas includes a servo-motor responsive to the error signal from the amplitude comparator means to cause such error signal to tend to disappear.

5. In an airborne radar system wherein an antenna assembly is repetitively scanned through an azimuth sector and the elevation angle thereof is, from scan to azimuth scan, changed cyclically through a predetermined range, a raster control system for a cathode ray tube whereby the elevation angle of the antenna system may be displayed as a function of azimuth angle of the antenna system and the range to the radar horizon may be indicated by a gradation in the brightness of the image formed on the viewing screen of such cathode ray tube, comprising:
(a) means for generating a quantized horizontal deflection voltage in accordance with the azimuth position of the antenna assembly throughout each azimuth scan;
(b) means for generating a vertical sweep voltage for each step in the quantized horizontal deflection voltage in each azimuth scan;
(c) means for generating a blanking voltage during the period in each vertical sweep when the amplitude of such sweep voltage exceeds the amplitude of a voltage indicative of the elevation angle of the antenna assembly; and,
(d) means for applying the quantized horizontal deflection voltage, the vertical sweep voltage and the blanking voltage to respective ones of the control electrodes of the electron gun to form, on the viewing screen thereof, an AZ-EL presentation wherein range is indicated by a gradation in brightness.

6. In an airborne radar system, a raster control system as in claim 5 wherein:
(a) the cathode ray tube has a long persistent viewing screen adapted to be erased by a high energy electron beam; and means for generating a high energy electron beam;
(b) the means for generating a quantized horizontal deflection voltage includes means for forming a second interlaced quantized horizontal deflection voltage; and,
(c) the second quantized horizontal deflection voltage, the vertical sweep voltage and the blanking voltage are applied to appropriate electrodes controlling the high energy beam to effect erasure of the succesive portions of the AZ-EL presentation wherein new information is to be displayed.

7. In an airborne radar system, a raster control system as in claim 6 wherein the means for generating a blanking voltage includes:
(a) means for generating a positive pulse at the beginning of each blanking voltage; and,
(b) means for mixing such positive pulse with the blanking voltage to intensify the brightness of the indication on the viewing screen when the amplitude of the vertical sweep voltage equals the amplitude of the voltage indicative of elevation angle of the antenna assembly.

8. In a radar system wherein the elevation angle of an antenna is displayed as a function of the azimuth angle thereof, display apparatus comprising:
(a) a cathode ray tube incorporating at least one electron gun, such gun including an intensity control electrode, a horizontal deflection electrode and a vertical deflection electrode to control the position and intensity of a cathode ray on the viewing screen of such tube;
(b) horizontal deflection control means including means for quantizing a first voltage indicative of the azimuth angle of the antenna and for applying such quantized voltage to the horizontal deflection electrode;
(c) vertical deflection control means including means for generating, for each step in the quantized voltage, a sweep voltage and for applying such sweep voltage to the vertical deflection electrode;
(d) means for deriving a second voltage indicative of the elevation angle of the antenna and comparing such second voltage with each vertical sweep voltage to produce a portion of the control signal applied to such intensity control electrode, such portion having a high positive amplitude when the second voltage equals the amplitude of each sweep voltage and a high negative amplitude when the amplitude of the second voltage is less than the amplitude of each sweep voltage;
(e) means, including a source of D.C. voltage, for producing the remaining portion of the control signal applied to the intensity control electrode; and,
(f) means for applying both portions of the control signal to the intensity control electrode to control the brightness of the presentation on the viewing screen of the cathode ray tube.

References Cited by the Examiner
UNITED STATES PATENTS
3,127,604    3/64    Herriott _____ 343—7.4

CHESTER L. JUSTUS, *Primary Examiner.*

KATHLEEN CLAFFY, *Examiner.*